US010467502B2

(12) United States Patent
Ren et al.

(10) Patent No.: US 10,467,502 B2
(45) Date of Patent: Nov. 5, 2019

(54) SURFACE DEFECT DETECTION (71) Applicant: ROLLS-ROYCE plc, London (GB)

(72) Inventors: Ruo Xu Ren, Singapore (SG); Terence Hung, Singapore (SG); Kay Chen Tan, HK (HK)

(73) Assignee: ROLLS-ROYCE plc, London (GB)

( * ) Notice: Subject to any disclaimer, the term of this patent is extended or adjusted under 35 U.S.C. 154(b) by 66 days.

(21) Appl. No.: 15/925,010

(22) Filed: Mar. 19, 2018

(65) Prior Publication Data
US 2018/0268257 A1 Sep. 20, 2018

(30) Foreign Application Priority Data

Mar. 20, 2017 (GB) .................................. 1704373.8

(51) Int. Cl.
G06K 9/00 (2006.01)
G06K 9/62 (2006.01)
G06T 7/00 (2017.01)
G06N 3/04 (2006.01)
G06N 3/08 (2006.01)

(52) U.S. Cl.
CPC .............. *G06K 9/6256* (2013.01); *G06N 3/04* (2013.01); *G06N 3/084* (2013.01); *G06T 7/001* (2013.01); *G06T 7/0004* (2013.01); *G06T 2207/20021* (2013.01); *G06T 2207/20081* (2013.01); *G06T 2207/20084* (2013.01); *G06T 2207/30164* (2013.01)

(58) Field of Classification Search
CPC ..... G06T 7/0004; G06T 7/001; G06T 19/006; G06T 2207/30164; G06T 2207/20081; G06T 2207/20084; G06K 9/6256; G06N 3/084

See application file for complete search history.

(56) References Cited

U.S. PATENT DOCUMENTS

| 9,275,347 | B1 * | 3/2016 | Harada | G06F 16/285 |
| 9,373,059 | B1 * | 6/2016 | Heifets | G16B 40/00 |
| 9,536,293 | B2 * | 1/2017 | Lin | G06T 7/0002 |
| 9,538,925 | B2 * | 1/2017 | Sharma | A61B 5/0261 |
| 9,589,210 | B1 * | 3/2017 | Estrada | G06T 7/344 |
| 9,668,699 | B2 * | 6/2017 | Georgescu | A61B 5/7267 |

(Continued)

FOREIGN PATENT DOCUMENTS

| WO | 2004090521 | 10/2004 |
| WO | 2016201947 | 12/2016 |

OTHER PUBLICATIONS

Valavanis, et al., "Multiclass defect detection and classification in weld radiographic images using geometric and texture features", Expert Systems with Applications, vol. 37, pp. 7606-7614, 2010.

(Continued)

*Primary Examiner* — Amir Alavi
(74) *Attorney, Agent, or Firm* — Oliff PLC (57) ABSTRACT

A method is provided of forming a neural network for detecting surface defects in aircraft engine components. The method includes: providing (i) a pre-trained deep learning network and (ii) a learning machine network; providing a set of pixelated training images of aircraft engine components exhibiting examples of different classes of surface defect; training the trainable weights of the learning machine network on the set of training images.

13 Claims, 6 Drawing Sheets

(56) References Cited

U.S. PATENT DOCUMENTS

| | | | |
|---|---|---|---|
| 9,760,807 B2* | 9/2017 | Zhou | G06T 7/143 |
| 10,223,582 B2* | 3/2019 | Tan | G06K 9/00348 |
| 2005/0002560 A1 | 1/2005 | Yamamoto et al. | |
| 2016/0104276 A1 | 4/2016 | Engel | |
| 2017/0243058 A1* | 8/2017 | Tan | G06K 9/00348 |
| 2018/0089562 A1* | 3/2018 | Jin | G06F 7/5443 |
| 2018/0114055 A1* | 4/2018 | Wang | G06K 9/00268 |
| 2018/0268257 A1* | 9/2018 | Ren | G06K 9/6256 |
| 2019/0206071 A1* | 7/2019 | Yan | G06K 9/00208 |

OTHER PUBLICATIONS

Song, et al., "Wood Materials Defects Detection Using Image Block Percentile Color Histogram and Eigenvector Texture Feature", International Conference on Information Sciences, Machinery, Materials and Energy (ICISMME 2015), pp. 780-784.

Silven, et al., "Wood inspection with non-supervised clustering", Machine Vision and Applications (2003) 13, pp. 275-285, Digital Object Identifier (DOI) 10.1007/s00138-002-0084-z.

Lu, et al., "Learning from Weak and Noisy Labels for Semantic Segmentation", IEEE Transactions on Pattern Analysis and Machine Intelligence, vol. 39, No. 3, Mar. 2017, pp. 486-500.

Verbeek, et al., "Region Classification with Markov Field Aspect Models", IEEE 1-4244-1180-7/07, 2007.

Vezhnevets, et al., "Towards Weekly Supervised Semantic Segmentation by Means of Multiple Instance and Multitask Learning", IEEE 978-4244-6985-7/10, 2010.

Liu, et al., "Weakly-Supervised Dual Clustering for Image Semantic Segmentation", NLPR, Institute of Automation, Chinese Academy of Sciences, Beijing, China, 100190.

Xu, et al., "Tell Me What You See and I Will Show You Where It Is", IEEE Computer Society Conference on Computer Vision and Pattern Recognition (CVPR), Jun. 2014.

Chai, et al., "Exploiting Sparsity for Image-Based Object Surface Anomaly Detection", Rolls-Royce@Nanyang Technological University Corporate Lab, Singapore, IEEE 978-1-4799-9988-01/16, 2016.

K. Simonyan, et al., "Very Deep Convolutional Networks for Large-Scale Image Recognition", Visual Geometry Group, Department of Engineering Science, University of Oxford, arXiv technical report, 2014.

Huang, et al., "Extreme learning machines: a survey", International J. Machine. Learn. & Cyber, 2, pp. 107-122, 2011.

LeCun, et al., "Deep learning", Nature, vol. 521, May 28, 2015.

Donahue, et al., "DeCAF: A Deep Convolutional Activation Feature for Generic Visual Recognition", arXiv:1310.1531v1 [cs.CV], Oct. 6, 2013.

Schmidhuber, "Deep Learning in Neural Networks: An Overview", Technical Report IDSIA-03-14/arXiv:1404.7828, v4, 88 pages.

Sermanet, et al., "OverFeat: Integrated Recognition, Localization and Detection using Convolutional Networks", arXiv:1312.6229v4 [cs.CV], Feb. 24, 2014.

Montavon et al., "Neural Networks: Tricks of the Trade", 2nd edition, LNCS 7700, pp. 1-5, 2012.

Huang, et al., "Extreme learning machine: Theory and applications", Neurocomputing 70 2006, pp. 489-501.

Great Britain Search Report dated Aug. 31, 2017 issued in GB Patent Application No. 1704373.8.

* cited by examiner

SURFACE DEFECT DETECTION

CROSS-REFERENCE TO RELATED APPLICATIONS

This disclosure claims the benefit of UK Patent Application No. GB 1704373.8, filed on 20 Mar. 2017, which is hereby incorporated herein in its entirety.

BACKGROUND

Field of the Invention

The present invention relates to neural network detection of surface defects on aircraft engine components.

Description of the Related Art

Surface inspection is an important topic in industry, especially in the area of product quality control. The conventional approach for surface inspection is to perform it manually. However, with the advancement of computer vision techniques and increases in computational power, automated inspection processes are becoming more popular. Automated surface inspection (ASI) usually requires an expert to manually label the pixel-level ground truths for the location of defect areas, and the labelled images then serve as training data [1]-[3]. The labelling process can be highly time-consuming if the data are large-scale or there are many different types of defect. In most cases, only weak (image-level) labels are available instead of strong (pixel-level) labels in surface inspection data, and the weak labels can be noisy. A method that learns to detect defects from noisy and weak labels would be beneficial in industry.

Workers have dealt with semantic segmentation using weak labels in object recognition tasks [4]-[8]. These approaches first segment the image into different objects based on pixel similarities, and associate the regions with the weak label. However, surface defects are unlike objects with clear edge or texture difference in object recognition tasks. There are large varieties of surface defects identifiable by textural anomaly, geometrical abnormality, or colour difference. Thus the segmentation-based approaches are hard to apply to ASI tasks. [9] addresses this problem by computing the residual of the input image from an image bank in a database by sparse coding. However, this method requires there to be a set of images with similar lighting condition and view points as compared to the input images. In addition, the computational cost is high since the sparse coding computes features over the bank of images.

BRIEF SUMMARY OF THE INVENTION

To deal with weak and noisy labels in ASI, the present invention uses an approach based on combining the front end of a pre-trained deep learning network (hereafter also termed a PDLN) [10] and a learning machine network (hereafter also termed an extreme learning machine—ELM) [11], [12]. This combined approach allows a resulting combined neural network to be formed which benefits from the pre-existing general classification and localization ability of the PDLN but which at the same time is quickly and efficiently trainable via the ELM to more specifically detect surface defects in aircraft engine components.

Accordingly, in a first aspect, the present invention provides a method of forming a neural network for detecting surface defects in aircraft engine components, the method including:

providing (i) a PDLN having, in sequence, an input layer for receiving pixel values of pixelated images of objects, a set of convolutional layers, a set of fully-connected layers, and an output layer, wherein the PDLN has fixed weights and is pre-trained such that its output layer can classify the objects into different object classes and identify the locations of the objects within the images, and (ii) an ELM having, in sequence, an input layer, at least one hidden layer, and an output layer, wherein the values of the nodes of the input layer of the ELM derive from the values of the nodes of one of the convolutional layers of the PDLN, the weights from at least one of the layers of the ELM to the next layer of the ELM are trainable but the weights from at least another one of the layers of the ELM to the next layer of the ELM are fixed, and the nodes of the output layer of the ELM indicate whether a given surface defect class is displayed by a given image;

providing a set of pixelated training images of aircraft engine components exhibiting examples of different classes of surface defect, the training images being labelled with the surface defect classes exhibited by their respective components such that each class of surface defect is represented by a respective subset of the training images, and each training image being divided into one or more patches which are respective sub-areas of that image; and training the trainable weights of the ELM on the set of training images by inputting each patch into the input layer of the PDLN and adjusting the trainable weights on the basis of a comparison between the node values of the output layer of the ELM and the surface defect class label of the parent training image of that patch;

whereby the layers of the PDLN from its input layer to its convolutional layer from which the values of the nodes of the input layer of the ELM derive, together with the layers of the ELM after the training of its trainable weights form a combined network for detecting surface defects in aircraft engine components having an input layer which is the input layer of the PDLN and an output layer which is the output layer of the ELM.

In this way, during training the PDLN can extract patch features, and these features can then be fed into the ELM with a class label that is set the same as that of the parent image. During subsequent use of the combined network post-training, each patch of a pixelated actual image can be fed into the combined network to determine which class of surface defect (if any) is displayed by that patch.

In a second aspect, the present invention provides a method of detecting surface defects in aircraft engine components, the method including:

providing the combined network formed by performing the method the first aspect;

providing a pixelated actual image of an aircraft engine component, the actual image being divided into one or more patches which are respective sub-areas of that image; and inputting each patch into the input layer of the combined network, and reading the corresponding node values of the output layer of the combined network to determine whether a surface defect (and preferably whether a given surface defect class) is displayed by that patch. The method may further include: displaying the class and/or location of surface defects in the actual image.

In a third aspect, the present invention provides the combined network formed by performing the method of the first aspect.

Further aspects of the present invention provide: a computer readable medium storing the combined network of the third aspect; and a data processing system comprising one or more processors adapted to perform the method of the second aspect. For example, a data processing system can be provided for detecting surface defects in aircraft engine components, the system including: one or more processors configured to: input each patch of a pixelated actual image into the input layer of the combined network, wherein the actual image is divided into one or more patches which are respective sub-areas of that image; and read the corresponding node values of the output layer of the combined network to determine whether a given surface defect class is displayed by that patch. The system thus corresponds to the method of the third aspect. The system may further include: a computer-readable medium operatively connected to the processors, the medium storing the combined network formed by performing the method the first aspect, and the actual image of the aircraft engine component. The system may further include: a display device for displaying the class and location of surface defects in the actual image.

Optional features of the invention will now be set out. These are applicable singly or in any combination with any aspect of the invention.

The PDLN may be pre-trained such that its output layer can classify the objects into different object classes and identify the locations of the objects within the images.

Typically, each training and/or each actual image is divided into plural patches. This is because surface defects are generally relatively small scale features in the field of view of the images. However, this does not exclude that each image may have only one patch, i.e. the only sub-area of the image may be the entire image.

The nodes of the output layer of the ELM may indicate whether a given surface defect class is displayed by a given patch by specifying respective confidence levels for the presences of the different classes of surface defect within the given patch. In this way, during use of the combined network post-training, each patch of a pixelated actual image can be fed into the combined network and those patches with confidence values above threshold can be detected as defects.

The layers of the PDLN counting from its input layer up to and including its convolutional layer from which the values of the nodes of the input layer of the learning machine network derive may include just two, three or four convolutional layers. Having only a few convolutional layers is generally effective for learning low-level information, such as texture and local geometry, of the type which tends to characterise surface defects in engine components. This low-level information can be lost if more convolutional layers are used.

The layers of the PDLN counting from its input layer up to and including its convolutional layer from which the values of the nodes of the input layer of the learning machine network derive may include at least one max pooling layer.

The node values of the output layer of the ELM can be thresholded to compensate for variation in image brightness across the training images, the trainable weights of the learning machine network being adjusted on the basis of a comparison between the thresholded node values of the output layer of the learning machine network and the surface defect class label of the parent training image of that patch. In this way, minimum confidence thresholds for patches to contain a defect can be set according to the lighting condition (e.g. the mean brightness value) of the parent image. Such thresholding can equally be applied to the node values of the output layer of the ELM when the combined network is used to detect surface defects in aircraft engine components, i.e. to compensate for variation in image brightness across actual images after training is completed.

The weights from at least one of the layers of the ELM to the next layer of the learning machine network are trainable but the weights from at least another one of the layers of the ELM to the next layer of the ELM are fixed. The fixed weights can help to speed up training and testing. The values of these fixed weights may be set randomly.

The ELM may have only one hidden layer. In this case, if the weights out of the hidden layer are trainable then the weights into the hidden layer are fixed (e.g. with randomly set values), or vice versa.

BRIEF DESCRIPTION OF THE DRAWINGS

Embodiments of the invention will now be described by way of example with reference to the accompanying drawings in which:

FIG. 3 shows example images of components exhibiting the surface defects (A) texture anomaly, (B) dent and (C) plus metal;

FIG. 4 shows example images from a quality control data set, the left column being raw test images and the right column being patch detection results superimposed on the raw images for the surface defects (A) shadowing, (B) scratch (C) melt, (D) recrystallization (rx), and (E) plus metal;

DETAILED DESCRIPTION

Pre-trained Deep Learning Network (PDLN):

An embodiment of the present invention has been implemented using a PDLN named VGG-16 [10] that is a convolutional neural network (CNN) with 16 weight layers and 138 million parameters. More information on CNNs can be found in Appendix. VGG-16 has 16 weight layers and 5 max-pooling layers. The trained weights of the ILSVRC 2014 dataset can be found on the website https://gist.github.com/baraldilorenzo/07d7802847aaad0a35d3.

VGG-16 first applies the convolutional and max-pooling layers followed by three fully-connected layers (the first two with ReLU activation and the third with Softmax activation. Features transferred from the fully-connected layers of the PDLN have been applied into many object recognition tasks [13].

Figure 1:
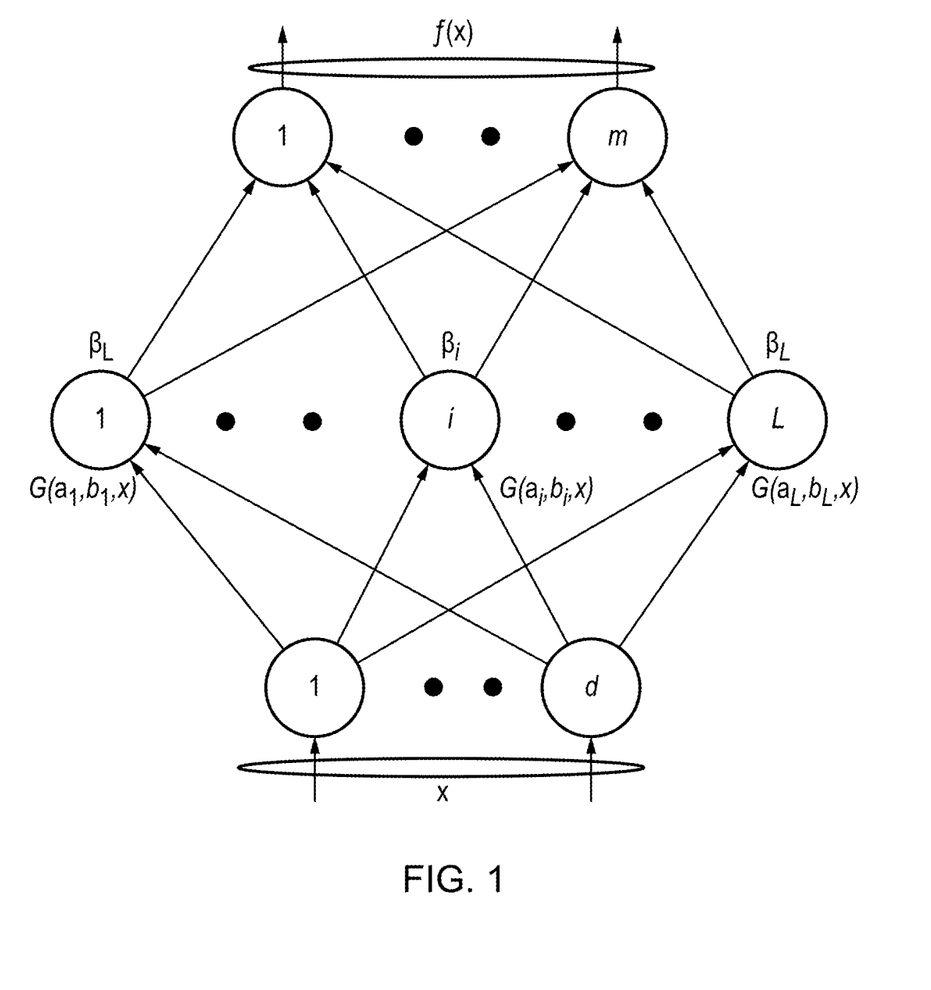
FIG. 1 shows schematically the structure of an extreme learning machine (ELM)

Extreme Learning Machine (ELM):

The ELM used in the embodiment of the present invention is a single-hidden-layer neural network with randomized hidden weights. The structure of the ELM is shown in FIG. 1. The weights from the input layer to the hidden layer are randomly initialized according to a function G(a, b, x) and then fixed, while the weights from the hidden layer to the output layer are trained based on the training data. As only weights from one layer require training, the ELM in this case is equivalent to a least square optimization problem. Such a structure allows the ELM to train rapidly and efficiently over large-scale data.

Figure 2:
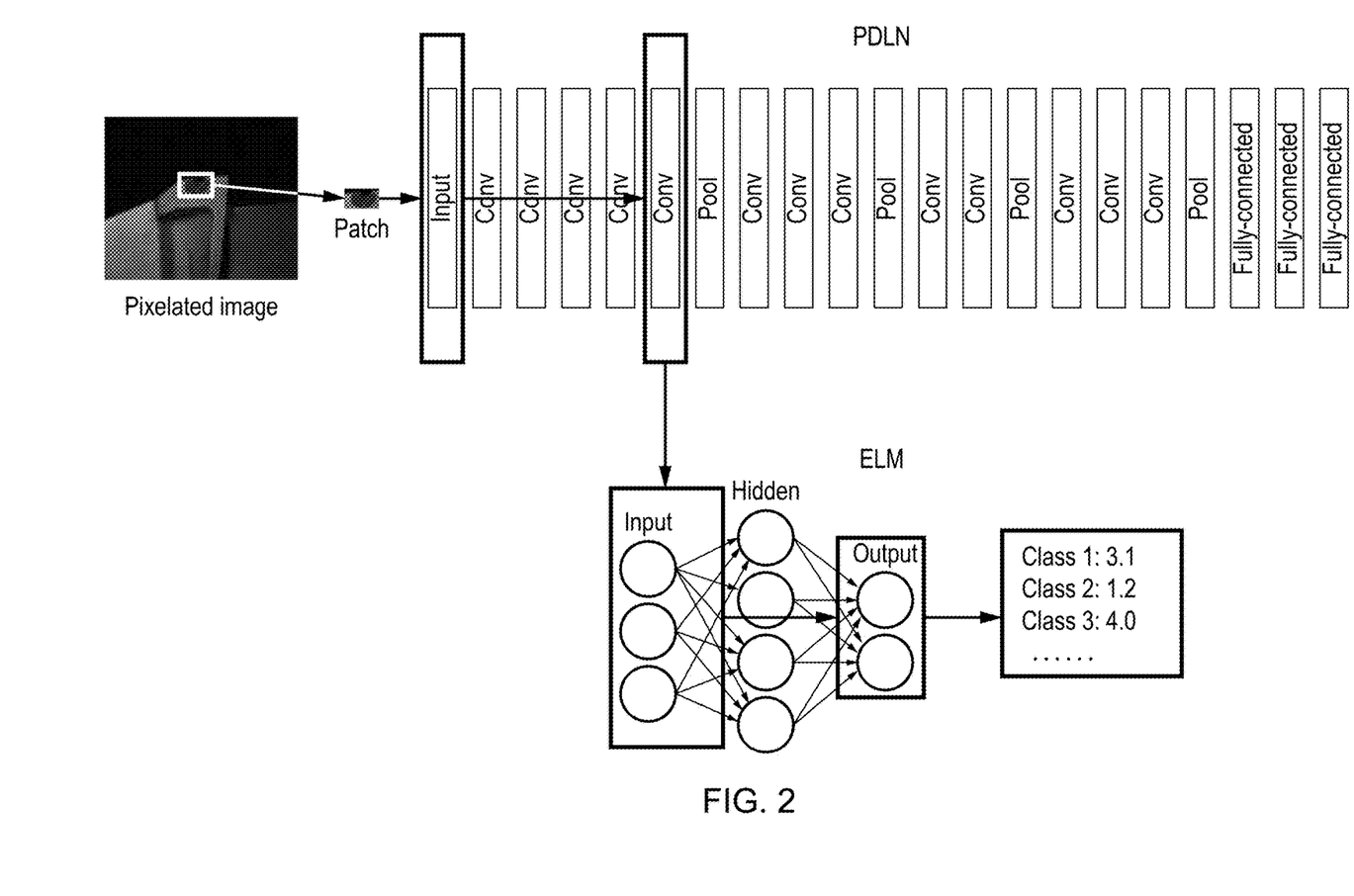
FIG. 2 shows schematically the overall structure of a combined network formed form a pre-trained deep learning network (PDLN) and an ELM.

Combined Network:

The overall structure of the combined network formed form the PDLN and the ELM is shown in FIG. 2.

The size of the input image into VGG-16 is 3×224×224. Unlike conventional approaches for feature transferring using the PDLN, the low-level feature from the fourth convolutional layer is selected instead of a high-level feature from the fully-connected layers. This is because 1) the low-level feature better describes surface defect information, such as texture, than a high-level feature, 2) the two-dimensional structure of the image data is retained in the lower levels, and 3) using low-level features is computationally efficient. In the fourth convolutional layer, the input image is rescaled to 128×112×112 data. By visually examination of the 128 convolutional filters, 3 filters are identified that seem most useful for defect detection of surface defects.

With the low-level patch features extracted, each patch is assigned to the defect class label of its parent image. For example, every patch of a 'class 1' surface defect type parent image is assigned to 'class 1' whether or not a defect is contained in that patch. The patches, and indeed their parent images, are noisy in the sense that not all patches/parent images classified to a given surface defect type exhibit that defect. Thus a given patch/parent image can be labelled to a particular class merely because another image of the same component is labelled to that class.

With the patch features and patch labels obtained, the next step is to feed the information derived from each patch into the ELM. Thus each input sample is the flattened patch feature. Conveniently the ELM can be structured with the number of hidden neurons set at 1000, and the activation function set as the radial basis function. The output from the ELM for each patch is a respective confidence level for each surface defect class type.

Thresholding:

The confidence levels from the ELM are influenced by the brightness of the images. To address this issue, the average brightness value over the area of each input image can be calculated. This then provides a range of average brightnesses over all the input images. This range is divided into 100 intervals, and each patch is allocated to the interval corresponding to the average brightness of its parent image. Thus if the range of average image brightness is [0.0, 1.0], the brightness intervals become:

$$\{j \in \mathbb{N}, 1 \leq j \leq 100 |$$

$$[0.0, 0.01), \ldots, [0.01(j-1), 0.01j), \ldots [0.99, 1.0)\}. \quad (1)$$

The threshold for defect class i and interval j is then defined by the 99.9 percentile as follows:

$$T_{ij} = \text{Percentile}_{99.9}(\{C_{i,p} | 0.01(j-1) \leq \mu_p \leq 0.01j\}), \quad (2)$$

where

Percentile$_{99.9}$(S)=99.9 percentile of set S, $C_{i,p}$=Confidence level for class i of patch p from ELM, and $\mu_p$=The average value of patch intensity.

Given a dataset with N classes, the threshold matrix T is of size 100×N. If the confidence level of patch p that falls into interval j is above $T_{ij}$, the patch is considered a defect patch.

The number of brightness intervals and/or the percentile threshold can be adjusted as appropriate for a given dataset and lighting conditions.

Figure 3A:
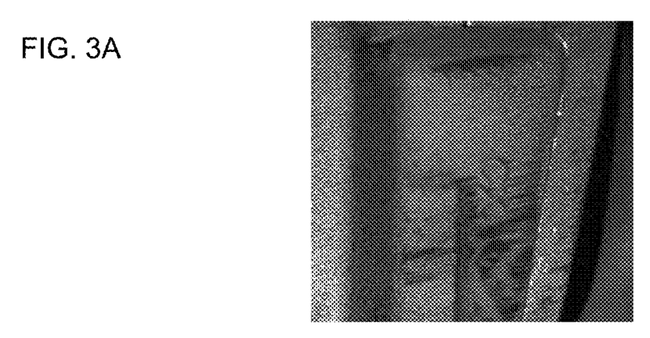
Figure 3B:
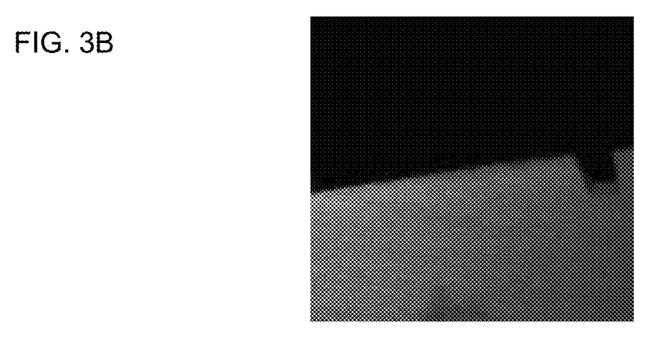
Figure 3C:
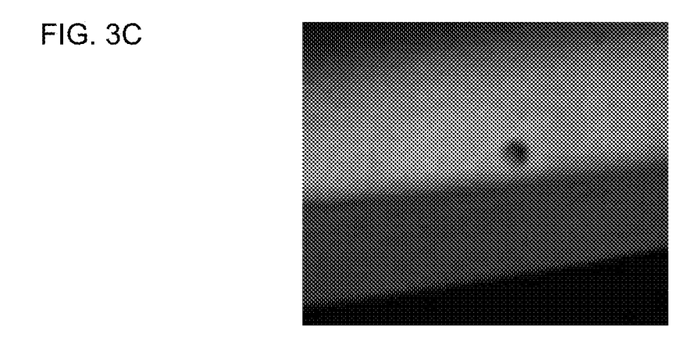
Figure 4A:
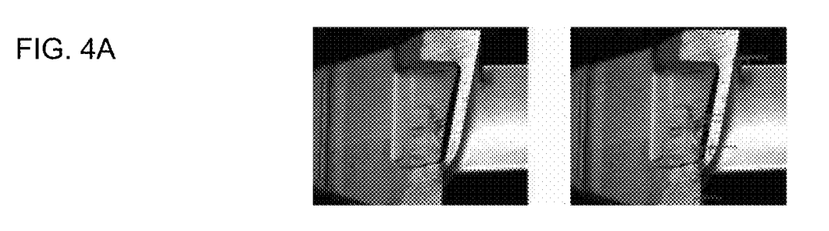
Figure 4B:
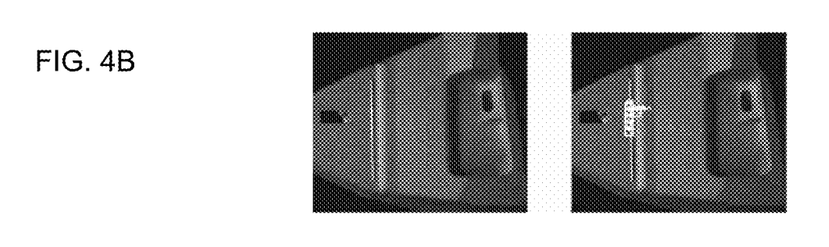
Figure 4C:
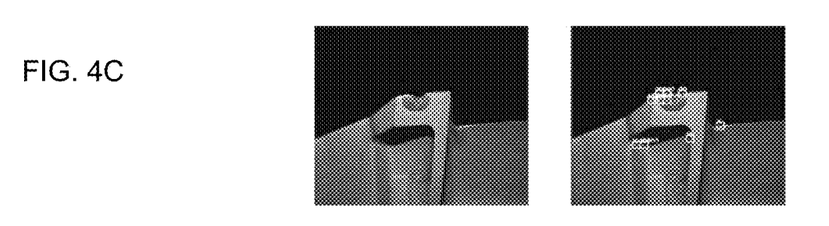
Figure 4D:
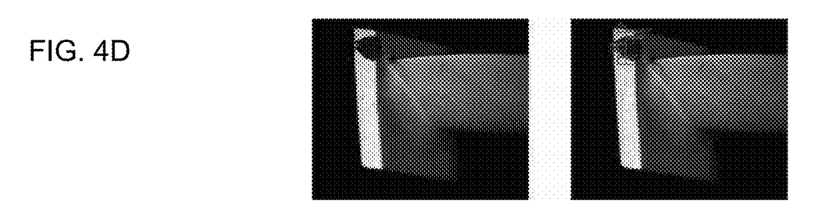
Figure 4E:
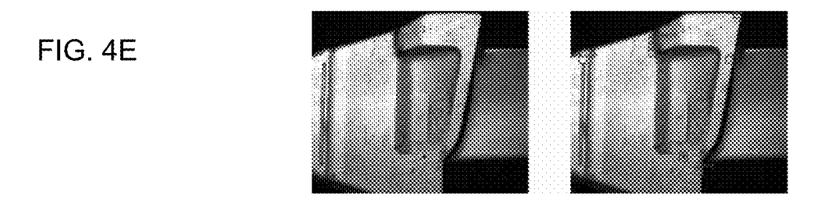

Experimental Results:

A product quality control dataset from the aerospace industry was used to train the combined network. The dataset included images for components (rotor blades) of an aircraft gas turbine engine taken from different viewpoints and under different lighting conditions. If any surface defect was spotted in an image of a component, the whole image series of that component was labelled as having that class defect. The labels of the images were thus very noisy, as the majority of defects were visible only under certain lighting condition and specific viewpoints. The dataset included eleven classes of defects, such as shadowing, dent and plus metal, examples of which are shown in FIG. 3. Shadowing is an example of a texture anomaly, and dent and plus metal are examples of geometrical anomalies.

The dataset included 605 images with 55 samples in each defect class. Images of each class were randomly split into 40 samples for training and 15 for testing.

The training was performed as follows: each training image (size 3×224×224) was fed into VGG-16 and a corresponding image feature (size 3×112×112) was collected from its fourth convolutional layer. Each image feature was divided into 28×28 patches, with a patch size of 3×8×8. All the patches from a given defect class i were labelled as i. This resulted in 784 (i.e. 28×28) training patches per training image and 31,360 (i.e. 784×40) training patches per defect class. The weights of the ELM were trained based on these patches, with each training patch feature being input into the ELM as a flattened vector of the 3×8×8 patch.

The trained combined network was then evaluated as a detector for Region-of-Interest (ROI). This was to evaluate the performance of the trained combined network in detecting defect areas, without considering the type of defect. Thereafter, the classification performance of the trained combined network was evaluated.

To evaluate the ROI results, the information for defect type was ignored. Although each image was labelled with one defect, there could in fact be multiple types of defects or no defects on the component of a given image. For example, an image labelled with class 'dent' may also have 'scratch' and 'surface texture shroud' defects. In the ROI evaluation, the indication made by the output layer of the combined network as a result of inputting each patch from the test images into the input layer of the network was one of four types, namely true positive (TP), false positive (FP), true negative (TN) and false negative (FN). The meaning of each type is as follows:

TP: defect-containing patch that is indicated as containing a defect.

FP: normal patch (i.e. without any defect) that is indicated as containing a defect.

TN: normal patch that is indicated as normal.

FN: defect-containing patch that is indicated as normal.

Precision, recall, accuracy and F1 score were used as metrics in the ROI evaluation. The definitions of the four metrics are as shown in (3)-(6).

$$\text{precision} = TP/(TP+FP) \quad (3)$$

$$\text{recall} = TP/(TP+FN) \quad (4)$$

$$\text{accuracy} = (TP+TN)/(TP+TN+FP+FN) \quad (5)$$

$$F1 = 2 \cdot \text{precision} \cdot \text{recall}/(\text{precision}+\text{recall}) \quad (6)$$

The ROI evaluation results for each defect type is shown in Table I. The trained combined network has high recall, which is a preferred property as false negatives are more costly than false positives in quality control.

TABLE I

ROI evaluation results

| Defect | TP | FP | TN | FN | Precision | Recall | Accuracy | F1 |
|---|---|---|---|---|---|---|---|---|
| surface texture shroud | 49 | 24 | 11680 | 7 | 67.12% | 87.50% | 99.74% | 75.97% |
| shadowing | 24 | 22 | 11711 | 3 | 52.17% | 88.89% | 99.79% | 65.75% |
| scuff | 27 | 24 | 11706 | 3 | 52.94% | 90.00% | 99.77% | 66.67% |
| scratch | 47 | 32 | 11677 | 4 | 59.49% | 92.16% | 99.69% | 72.31% |
| dirt | 22 | 23 | 11708 | 7 | 48.89% | 75.86% | 99.74% | 59.46% |
| rx | 18 | 10 | 11728 | 4 | 64.29% | 81.82% | 99.88% | 72.00% |
| damage | 8 | 24 | 11725 | 3 | 25.00% | 72.73% | 99.77% | 37.21% |
| artifact | 29 | 13 | 11713 | 5 | 69.05% | 85.29% | 99.85% | 76.32% |
| dent | 52 | 14 | 11689 | 5 | 78.79% | 91.23% | 99.84% | 84.55% |
| plus metal | 30 | 9 | 11718 | 3 | 76.92% | 90.91% | 99.90% | 83.33% |
| melt | 19 | 38 | 11694 | 3 | 76.92% | 90.91% | 99.90% | 83.33% |
| Overall | 325 | 233 | 128,749 | 47 | 58.24% | 87.37% | 99.78% | 69.89% |

As regards classification performance, the patch detection results were further divided into defect types. For example, 49 defect patches in 'surface texture shroud' images were correctly detected. However, these patches were not necessarily of the same defect type. To evaluate the classification performance, 161 image patches were manually selected including 21 surface texture shroud, 12 shadowing, 28 scuff, 20 scratch, 11 dirt, 18 recrystallization (rx), 10 damage, 12 artifact, 7 dent, 5 plus metal and 17 melt patches. Detection was considered to be correct if the selected patch is detected and classified into the correct class. Three metrics were used to evaluate the classification performance, detection rate (DR), classification rate (CIR), and confusion rate (ConR). The definitions of the three metrics are:

DR=percentage of defect patches that are detected.
CIR=percentage of defect patches that are detected and correctly classified.
ConR=percentage of defect patches that are detected but wrongly classified.

If the trained combined network learns domain knowledge well, it should have high DR and CIR, and low ConR. The classification results of selected patches are shown in Table II.

The table shows the proposed algorithm has good performance, with 78.86% DR, 44.89% CIR and 33.75% ConR. Among all the defect types, surface texture shroud (sts), shadowing (shd), damage (dm) and artifact (artf) are well-learnt defect types, as DR and CIR are large and ConR are relatively small. Certain defect types including scuff, scratch, dirt, dent and melt are easy to detect but hard to classify. The network failed to detect any plus metal patches. However, it should not be concluded that the network cannot learn plus metal defect, as the prior probability of this defect type is low. A random selection of 55 images per class may not be enough for learning this defect type, as there can be limited defect areas in the training data that lead to a failure to capture the domain knowledge of plus metal. Further testing on larger-scale training data is needed in order to draw a conclusion.

Examples of detection results from the evaluation are shown in FIG. 4.

Conclusions:

The combined network based on the front end of a PDLN and an ELM was able to learn defect detection. The experimental results on an industrial quality control data set show that the combined network learns meaningful results. It has high performance as a region-of-interest detector, and it effectively classifies most defects well.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

TABLE II

Confusion matrix for patch classification (sts: surface texture shroud, shd: shadowing, dm: damage, artf: artifact, dt: dent, and pm: plus metal)

| | Prediction | | | | | | | | | | | | | Performance Metrics | | |
|---|---|---|---|---|---|---|---|---|---|---|---|---|---|---|---|---|
| Human Label | sts | shd | scuff | scratch | dirt | rx | dm | artf | dt | pm | melt | NA | Sum | DR | CIR | ConR |
| sts | 16 | 0 | 0 | 0 | 0 | 0 | 0 | 0 | 0 | 0 | 0 | 5 | 21 | 76.19% | 76.19% | 0.00% |
| shd | 1 | 10 | 0 | 0 | 0 | 0 | 0 | 0 | 0 | 0 | 0 | 1 | 12 | 91.67% | 83.33% | 8.33% |
| scuff | 1 | 5 | 12 | 2 | 1 | 0 | 0 | 4 | 0 | 0 | 1 | 2 | 28 | 93.86% | 42.86% | 50.00% |
| scratch | 2 | 0 | 1 | 10 | 2 | 0 | 0 | 3 | 0 | 1 | 0 | 1 | 20 | 95.00% | 50.00% | 45.00% |
| dirt | 0 | 0 | 0 | 0 | 3 | 1 | 0 | 6 | 0 | 0 | 0 | 1 | 11 | 90.91% | 27.27% | 63.64% |
| rx | 0 | 0 | 3 | 1 | 2 | 1 | 2 | 0 | 2 | 1 | 4 | 2 | 18 | 88.89% | 5.56% | 83.33% |
| dm | 0 | 0 | 0 | 0 | 0 | 0 | 9 | 0 | 0 | 0 | 0 | 1 | 10 | 90.00% | 90.00% | 0.00% |
| artf | 0 | 0 | 0 | 0 | 0 | 0 | 1 | 10 | 0 | 0 | 0 | 1 | 12 | 91.67% | 83.33% | 8.33% |
| dt | 0 | 1 | 0 | 0 | 2 | 0 | 0 | 1 | 0 | 0 | 1 | 2 | 7 | 71.43% | 0.00% | 71.43% |
| pm | 0 | 0 | 0 | 0 | 0 | 0 | 0 | 0 | 0 | 0 | 0 | 5 | 5 | 0.00% | 0.00% | 0.00% |
| melt | 0 | 1 | 1 | 1 | 3 | 0 | 0 | 1 | 0 | 0 | 6 | 4 | 17 | 76.47% | 35.29% | 41.18% |
| Overall | 20 | 17 | 17 | 14 | 13 | 2 | 12 | 25 | 2 | 2 | 12 | 25 | 161 | 78.86% | 44.89% | 33.75% |

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Convolutional Neural Networks:

Among various deep learning models, convolutional neural networks (CNNs) are the most popular structure for image-related applications. A CNN [13] is a type of neural network that is widely adopted for object recognition, scene classification, video analysis etc. [14-16]. Unlike fully-connected feedforward neural networks, CNNs encode the spatial correlation of images by including local connectivity with shared weights, pooling of local regions and the use of multiple layers.

Figure 5:
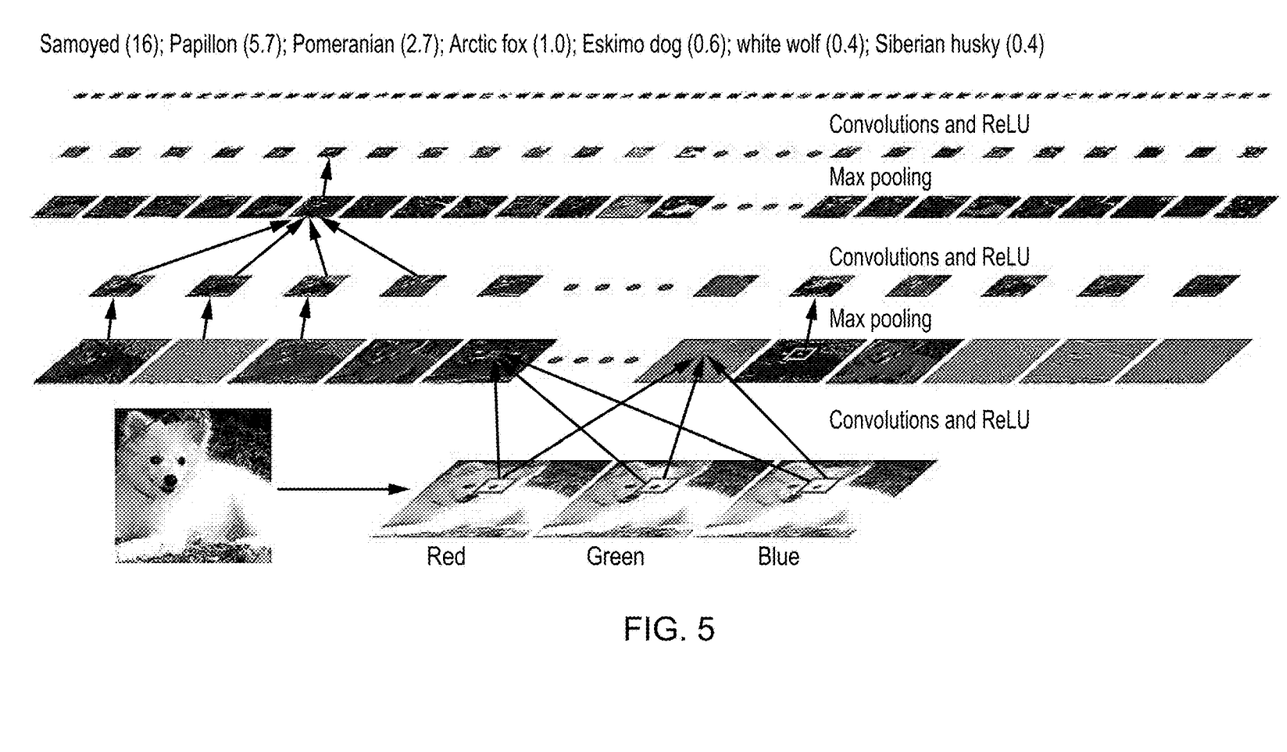
FIG. 5 shows schematically a typical convolutional neural network (CNN) structure.

A typical CNN structure of is shown in FIG. 5. It includes several types of layer: convolutional layers, pooling layers and fully connected layers. The first stage of a CNN normally consists of convolutional layers and pooling layers to extract feature maps from the input images. The second stage normally uses of fully-connected layers to classify images according to the obtained feature map.

Convolutional Layer:

A convolutional layer consists of a set of filters that are applied onto local image regions, thus generating high-dimensional feature maps. For instance, if the filter size is 5×5×3 (i.e. 5 pixels in width, 5 pixels in height, and 3 dimension for the colours of an RGB image), each filter is applied onto a 5×5 image patch and is then slid across the whole image. If the weight, bias and activation function of the filter are w, b and f, respectively, the output of the filter on a 5×5 patch is then $f(\Sigma_i w_i x_i + b)$, where $w_i$, and b are the weight and bias of pixel i. Each filter generates a two-dimensional feature map by sliding through one channel of the image. The CNN may involve multiple filters to learn complex image feature. For example, 12 filters of size 5×5×3 results in 12 feature maps of the input image.

Given the properties of convolutional layer, the design of the filter can be important. As well as filter size, the parameters of a filter include, depth, stride and zero-padding. The depth is the number of filters, with each learning different properties of the image, such as edge and colour. The stride is the step size to slide the filter over the image. For example, a stride size of 2 means the filter is moved by 2 pixels every time. The zero-padding parameter is the size of padding zeros around the boarder of the input image. This zero-padding helps to control the output size of the convolutional layer. If the input size is M·N, the filter size is F, the depth is D, the stride size is S, and the size of zero padding is P, then the output size of the convolutional layer is $$\left(\frac{M-F+2P}{S}+1\right) \times \left(\frac{N-F+2P}{S}+1\right).$$

Figure 6:
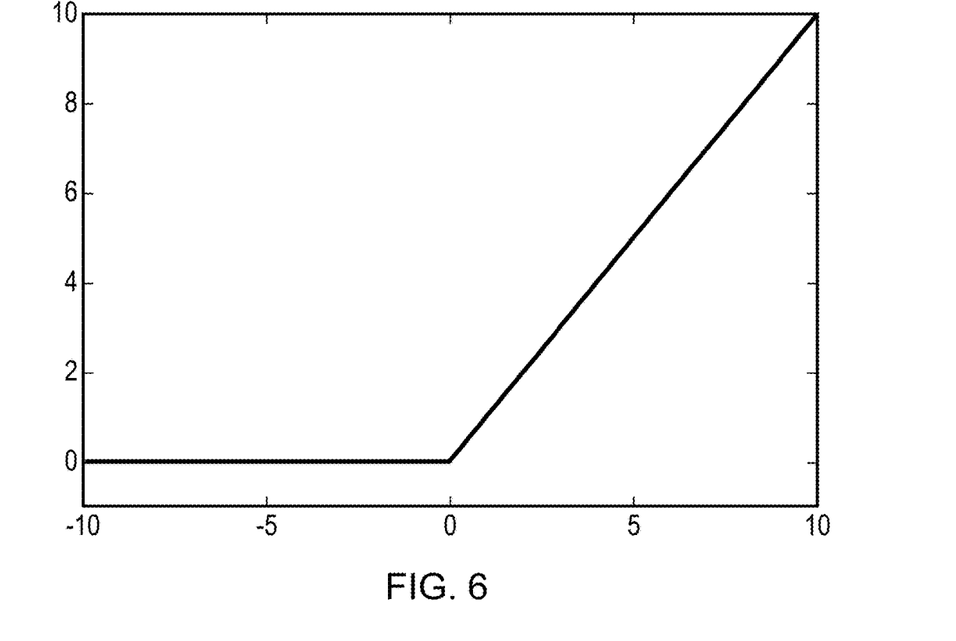
FIG. 6 shows a plot of the Rectified Linear Unit (ReLU) function.

Among activation functions for convolutional layers, the Rectified Linear Unit (ReLU) [17] is most popular. The ReLU function thresholds at zero in the form that f(x)=max (0; x). FIG. 6 shows a plot of the ReLU function. ReLU speeds up the training of the CNN as its gradient is either 0 or 1 in the back-propagation stage.

Pooling Layer:

A convolutional layer extracts the local features from the previous layer, while a pooling layer merges similar features and prevents over-fitting. A pooling layer performs an operator on every small patch of the input and is normally applied after a convolutional layer. If the input size is M·N·D, the size of pooling is m·n and the stride size is S, the output of the pooling layer is $$\left(\frac{M-m}{S}+1\right) \times \left(\frac{N-n}{S}+1\right) \times D.$$

Figure 7:
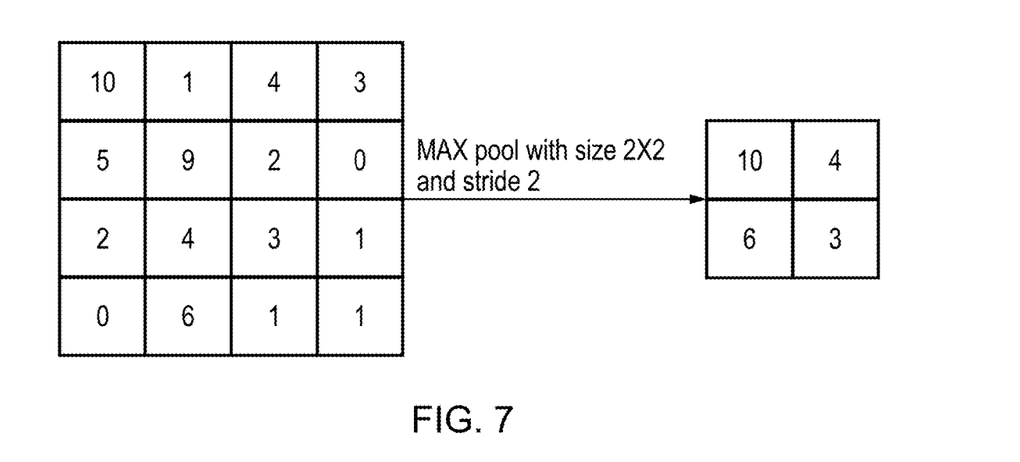
FIG. 7 shows example of MAX pooling.

One of the most commonly used operators for pooling layer is MAX, i.e. the layer extracts the maximum value of every patch. An example of MAX pooling is shown in FIG. 7. The pooling layer extract the maximum value of every 2×2 patch of the input.

Fully-Connected Layer:

To classify the image into respective classes, the last few layers of the CNN structure consist of fully-connected layers. The neurons of such layers are fully-connected. If the input is x, the activation function is f, the weight is W and the bias is b, then the output of a fully-connected layer is f(W·x+b).

REFERENCES

All references referred to herein are hereby incorporated by reference.

[1] I. Valavanis and D. Kosmopoulos, "Multiclass defect detection and classification in weld radiographic images using geometric and texture features," Expert Systems with Applications, vol. 37, no. 12, pp. 7606-7614, 2010.

[2] W. Song, T. Chen, Z. Gu, W. Gai, W. Huang, and B. Wang, "Wood materials defects detection using image block percentile colour histogram and eigenvector texture feature," 2015.

[3] O. Silvén, M. Niskanen, and H. Kauppinen, "Wood inspection with non-supervised clustering," Machine Vision and Applications, vol. 13, no. 5-6, pp. 275-285, 2003.

[4] Z. Lu, Z. Fu, T. Xiang, P. Han, L. Wang, and X. Gao, "Learning from weak and noisy labels for semantic segmentation," 2016.

[5] J. Verbeek and B. Triggs, "Region classification with markov field aspect models," in 2007 IEEE Conference on Computer Vision and Pattern Recognition. IEEE, 2007, pp. 1-8.

[6] A. Vezhnevets and J. M. Buhmann, "Towards weakly supervised semantic segmentation by means of multiple instance and multitask learning," in Computer Vision and Pattern Recognition (CVPR), 2010 IEEE Conference on. IEEE, 2010, pp. 3249-3256.

[7] Y. Liu, J. Liu, Z. Li, J. Tang, and H. Lu, "Weakly-supervised dual clustering for image semantic segmentation," in Proceedings of the IEEE Conference on Computer Vision and Pattern Recognition, 2013, pp. 2075-2082.

[8] J. Xu, A. G. Schwing, and R. Urtasun, "Tell me what you see and I will show you where it is," in Proceedings of the IEEE Conference on Computer Vision and Pattern Recognition, 2014, pp. 3190-3197.

[9] W. H. Chai, S.-S. Ho, and C.-K. Goh, "Exploiting sparsity for image-based object surface anomaly detection," in 2016 IEEE International Conference on Acoustics, Speech and Signal Processing (ICASSP). IEEE, 2016, pp. 1986-1990.

[10] K. Simonyan and A. Zisserman, "Very deep convolutional networks for large-scale image recognition," arXiv preprint arXiv:1409.1556, 2014.

[11] G.-B. Huang, Q.-Y. Zhu, and C.-K. Siew, "Extreme learning machine: theory and applications," Neurocomputing, vol. 70, no. 1, pp. 489-501, 2006.

[12] G.-B. Huang, D. H. Wang, and Y. Lan, "Extreme learning machines: a survey," International Journal of Machine Learning and Cybernetics, vol. 2, no. 2, pp. 107-122, 2011.

[13] Y. LeCun, Y. Bengio, and G. Hinton, "Deep learning," Nature, vol. 521, no. 7553, pp. 436-444, 2015.

[14] J. Donahue, Y. Jia, O. Vinyals, J. Ho man, N. Zhang, E. Tzeng, and T. Darrell, "Decaf: A deep convolutional activation feature for generic visual recognition," arXiv preprint arXiv:1310.1531, 2013.

[15] J. Schmidhuber, "Deep learning in neural networks: An overview", Neural Networks, vol. 61, pp. 85{117, 2015.

[16] P. Sermanet, D. Eigen, X. Zhang, M. Mathieu, R. Fergus, and Y. Le-Cun, "Overfeat: Integrated recognition, localization and detection using convolutional networks," in Int. Conf. on Learning Representations (ICLR 2014), Ban, Canada, April 2014.

[17] G. B. Orr and K.-R. Müller, Neural networks: tricks of the trade. Springer, 2003.

The invention claimed is:

1. A method of forming a neural network for detecting surface defects in aircraft engine components, the method including:
providing (i) a pre-trained deep learning network having, in sequence, an input layer for receiving pixel values of pixelated images of objects, a set of convolutional layers, a set of fully-connected layers, and an output layer, wherein the pre-trained deep learning network has fixed weights and is pre-trained, and (ii) a learning machine network having, in sequence, an input layer, at least one hidden layer, and an output layer, wherein the values of the nodes of the input layer of the learning machine network derive from the values of the nodes of one of the convolutional layers of the pre-trained deep learning network, the weights from at least one of the layers of the learning machine network to the next layer of the learning machine network are trainable but the weights from at least another one of the layers of the learning machine network to the next layer of the learning machine network are fixed, and the nodes of the output layer of the learning machine network indicate whether a given surface defect class is displayed by a given image;
providing a set of pixelated training images of aircraft engine components exhibiting examples of different classes of surface defect, the training images being labelled with the surface defect classes exhibited by their respective components such that each class of surface defect is represented by a respective subset of the training images, and each training image being divided into one or more patches which are respective sub-areas of that image; and
training the trainable weights of the learning machine network on the set of training images by inputting each patch into the input layer of the pre-trained deep learning network and adjusting the trainable weights on the basis of a comparison between the node values of the output layer of the learning machine network and the surface defect class label of the parent training image of that patch;
whereby the layers of the pre-trained deep learning network from its input layer to its convolutional layer from which the values of the nodes of the input layer of the learning machine network derive, together with the layers of the learning machine network after the training of its trainable weights form a combined network for detecting surface defects in aircraft engine components having an input layer which is the input layer of the pre-trained deep learning network and an output layer which is the output layer of the learning machine network.

2. A method of forming a neural network according to claim 1, wherein the pre-trained deep learning network is pre-trained such that its output layer can classify the objects into different object classes and identify the locations of the objects within the images.

3. A method of forming a neural network according to claim 1, wherein the nodes of the output layer of the learning machine network indicate whether a given surface defect class is displayed by a given patch by specifying respective confidence levels for the presences of the different classes of surface defect within the given patch.

4. A method of forming a neural network according to claim 1, wherein a given training image is labelled with a given surface defect class if the given training image, or any of the other training images showing the same component, displays a defect of the given class.

5. A method of forming a neural network according to claim 1, wherein the layers of the pre-trained deep learning network counting from its input layer up to and including its convolutional layer from which the values of the nodes of the input layer of the learning machine network derive include just two, three or four convolutional layers.

6. A method of forming a neural network according to claim 1, wherein the layers of the pre-trained deep learning network counting from its input layer up to and including its convolutional layer from which the values of the nodes of the input layer of the learning machine network derive include at least one max pooling layer.

7. A method of forming a neural network according to claim 1, wherein the node values of the output layer of the learning machine network are thresholded to compensate for variation in image brightness across the training images, the trainable weights of the learning machine network being adjusted on the basis of a comparison between the thresholded node values of the output layer of the learning machine network and the surface defect class label of the parent training image of that patch.

8. A method of forming a neural network according to claim 1, wherein the fixed weights of the learning machine network are set randomly.

9. A method of forming a neural network according to claim 1, wherein the learning machine network has only one hidden layer.

10. A method of detecting surface defects in aircraft engine components, the method including:
providing the combined network formed by:
providing (i) a pre-trained deep learning network having, in sequence, an input layer for receiving pixel values of pixelated images of objects, a set of convolutional layers, a set of fully-connected layers, and an output layer, wherein the pre-trained deep learning network has fixed weights and is pre-trained, and (ii) a learning machine network having, in sequence, an input layer, at least one hidden layer, and an output layer, wherein the values of the nodes of the input layer of the learning machine network derive from the values of the nodes of one of the convolutional layers of the pre-trained deep learning network, the weights from at least one of the layers of the learning machine network to the next layer of the learning machine network are trainable but the weights from at least another one of the layers of the learning machine network to the next layer of the learning machine network are fixed, and the nodes of the output layer of the learning machine network indicate whether a given surface defect class is displayed by a given image;

providing a set of pixelated training images of aircraft engine components exhibiting examples of different classes of surface defect, the training images being labelled with the surface defect classes exhibited by their respective components such that each class of surface defect is represented by a respective subset of the training images, and each training image being divided into one or more patches which are respective sub-areas of that image; and training the trainable weights of the learning machine network on the set of training images by inputting each patch into the input layer of the pre-trained deep learning network and adjusting the trainable weights on the basis of a comparison between the node values of the output layer of the learning machine network and the surface defect class label of the parent training image of that patch;

whereby the layers of the pre-trained deep learning network from its input layer to its convolutional layer from which the values of the nodes of the input layer of the learning machine network derive, together with the layers of the learning machine network after the training of its trainable weights form a combined network for detecting surface defects in aircraft engine components having an input layer which is the input layer of the pre-trained deep learning network and an output layer which is the output layer of the learning machine network;

providing a pixelated actual image of an aircraft engine component, the actual image being divided into one or more patches which are respective sub-areas of that image; and inputting each patch into the input layer of the combined network, and reading the corresponding node values of the output layer of the combined network to determine whether a surface defect is displayed by that patch.

11. A method of detecting surface defects according to claim 10, further including reading the corresponding node values of the output layer of the combined network to determine whether a given surface defect class is displayed by that patch.

12. A method of detecting surface defects according to claim 10, further including displaying the class and/or location of surface defects in the actual image.

13. A combined network formed by performing a method comprising:

providing (i) a pre-trained deep learning network having, in sequence, an input layer for receiving pixel values of pixelated images of objects, a set of convolutional layers, a set of fully-connected layers, and an output layer, wherein the pre-trained deep learning network has fixed weights and is pre-trained, and (ii) a learning machine network having, in sequence, an input layer, at least one hidden layer, and an output layer, wherein the values of the nodes of the input layer of the learning machine network derive from the values of the nodes of one of the convolutional layers of the pre-trained deep learning network, the weights from at least one of the layers of the learning machine network to the next layer of the learning machine network are trainable but the weights from at least another one of the layers of the learning machine network to the next layer of the learning machine network are fixed, and the nodes of the output layer of the learning machine network indicate whether a given surface defect class is displayed by a given image;

providing a set of pixelated training images of aircraft engine components exhibiting examples of different classes of surface defect, the training images being labelled with the surface defect classes exhibited by their respective components such that each class of surface defect is represented by a respective subset of the training images, and each training image being divided into one or more patches which are respective sub-areas of that image; and training the trainable weights of the learning machine network on the set of training images by inputting each patch into the input layer of the pre-trained deep learning network and adjusting the trainable weights on the basis of a comparison between the node values of the output layer of the learning machine network and the surface defect class label of the parent training image of that patch;

whereby the layers of the pre-trained deep learning network from its input layer to its convolutional layer from which the values of the nodes of the input layer of the learning machine network derive, together with the layers of the learning machine network after the training of its trainable weights form a combined network for detecting surface defects in aircraft engine components having an input layer which is the input layer of the pre-trained deep learning network and an output layer which is the output layer of the learning machine network.

* * * * *